United States Patent

[11] 3,600,944

| [72] | Inventor | William David John Hutchings<br>Alston Farm, Slapton, Kingsbridge, Devon, England |
|---|---|---|
| [21] | Appl. No. | 774,255 |
| [22] | Filed | Nov. 8, 1968 |
| [45] | Patented | Aug. 24, 1971 |

[54] MILK METERS
7 Claims, 4 Drawing Figs.

[52] U.S. Cl. ................................................ 73/203,
73/422 R
[51] Int. Cl. ................................................ G01f 1/00
[50] Field of Search ......................................... 73/202,
203, 206, 207, 421 A, 422

[56] References Cited
UNITED STATES PATENTS
475,596  5/1892  McDonald ................. 73/203

3,315,694  4/1967  Addison, Jr. ................. 73/203
3,349,618  10/1967  Maxwell ....................... 73/202

Primary Examiner—Richard C. Queisser
Assistant Examiner—Herbert Goldstein
Attorney—Holman & Stern ABSTRACT: A milk meter in which the incoming milk passes through two channels and which is provided with a floating choke the position of which determines the fraction of milk diverted from one of the channels to a calibrated vessel. The choke is sensitive to the pressure of the milk in the channel through which part of the milk flows and to an opposed pressure due to the part of the milk diverted through the other channel, the opposed pressures operating to maintain substantially constant the fraction directed to the calibrated vessel.

PATENTED AUG 24 1971

INVENTOR
WILLIAM DAVID JOHN HUTCHINGS
BY Glascock, Downing &
Seebold
ATTORNEYS

PATENTED AUG 24 1971 3,600,944

INVENTOR
WILLIAM DAVID JOHN HUTCHINGS
BY Blascock, Downing
& Seebold
ATTORNEYS

MILK METERS

This invention has particular reference to apparatus for the use with vacuum milking machines to measure the milk yield.

The invention has particular reference to such apparatus provided with a milk inlet and outlet for introduction in the milk line of the milking machine and in which a definite fraction of the milk introduced into the apparatus through said inlet is bled off and discharged into a suitable calibrated vessel, the yield of the cow being indicated by the level of the milk in said vessel.

If the milk is delivered to the apparatus at constant pressure and if the milk is of uniform viscosity the milk diverted to the calibrated vessel will always be a definite fraction of the milk yield of the cow being milked but the milk delivered to the apparatus varies in pressure during milking and is not of uniform viscosity. In consequence the milk diverted to the calibrated vessel is not necessarily the fraction predetermined by the cross-sectional areas of the passages through which the milk flows.

The present invention has for its object to provide an improved construction of meter of the type set forth which will give a more accurate indication of the volumetric measurement of the milk yield of individual cows than has heretofore been obtainable.

According to the present invention an apparatus for indicating the milk yield of individual cows comprises a casing having inlet and outlet for introduction in the milk line of a vacuum milking machine, a passage within said casing through which part of the milk introduced through the inlet is directed to the outlet, a second passage within said casing through which the other part of the milk is introduced through the inlet is directed to the outlet and a floatable choke controlling the ratio of the cross-sectional areas of the entrances to the said two passages, said choke being urged in one direction by the pressure of the milk flowing through the first-mentioned passage and urged in the other direction by the pressure of the milk directed through the said other passage, a fraction of the milk directed through the other passage being diverted to the calibrated vessel.

According to aspect of the invention the milk meter comprises an upper casing with a milk inlet and milk outlet for connection to the milk line of a milking machine, a calibrated vessel positioned below said casing and, interposed between the casing and the calibrated vessel, means by which the incoming milk is diverted into a channel through which flows a part of the milk and is also diverted into a second channel through which flows another part of the incoming milk, means by which a fraction of the milk is diverted from one of said channels into the calibrated vessel, and a choke which is subject to the pressure of the two flows and which, when raised or lowered by the opposed pressures, alters the first-mentioned channel to increase or decrease the pressure of milk in the second channel so as to maintain the diverted fraction from either of the two channels substantially constant.

The upper end of the calibrated vessel may have a neck on which seats a closure member provided with an external flange, a sleeve enclosing the closure member and which constitutes the choke, the sleeve having a horizontal flange to mate the flange of the closure member and upwardly and downwardly projecting skirts which form with the housing and the closure member the two channels.

The upper skirt may be upwardly and inwardly tapered and forms with the housing an annular gap the size of which is dependent on the position of the choke.

The closure member may have one or more ducts by which the channel formed between said closure member and the choke is placed in communication with the interior of the calibrated vessel.

To permit the contents of the said vessel to be discharged through the outlet said closure member may be free to drop clear of the neck when the meter is turned upside down.

In another construction of the milk meter the diverted fraction of the milk may be spread radially and a fraction thereof led to the calibrated vessel, the arrangement enabling a very small fraction of the milk yield being collected in the said vessel without substantially increasing the size of the meter.

The invention further consists in providing the meter as set forth in the preceding paragraph with an adjustable baffle or choke which can be preset to throttle the milk passing to the two channels, the presetting being such that with the milk supplied at a predetermined pressure the predetermined fraction will be diverted to the calibrated vessel.

The invention still further consists in a milk meter comprising a pipe for connection to the milk line and having a bevelled outlet end, an external flange below the bevelled end, a truncated conical choke axially slidable on the pipe and normally resting on the flange, the choke and bevelled end of the pipe forming an annular channel communicating with a chamber formed between the underside of the choke and the flange, an inverted cup enclosing the upper end of the pipe and the choke and forming a chamber at the head of the pipe, said inverted cap constituting a baffle and forming with the choke an annular channel, both channels communicating with the chamber at the head of the pipe an outer casing enclosing the inverted cup and having a milk outlet for connection to the milk line, the casing having adjustable stops to restrict the upward movement of the inverted cup, and a calibrated vessel positioned to receive the fraction of the milk discharged through the first-mentioned channel into the chamber between the choke and flange.

The flange may have one or more passages through which the predetermined fraction of milk is diverted, the remainder of the milk which passes through the channel formed by the bevelled end of the inlet pipe and the choke being diverted to join the milk which has passed through the other channel.

The calibrated vessel may have a funnel at its upper end to receive the diverted fraction and to form with the inverted cup a cavity which receives the remainder of the milk, said cavity communicating with an annular passage between the cup and casing which in turn is in communication with the milk outlet.

Preferred embodiments of the invention will now be described with reference to the accompanying drawings wherein.

Figure 1:
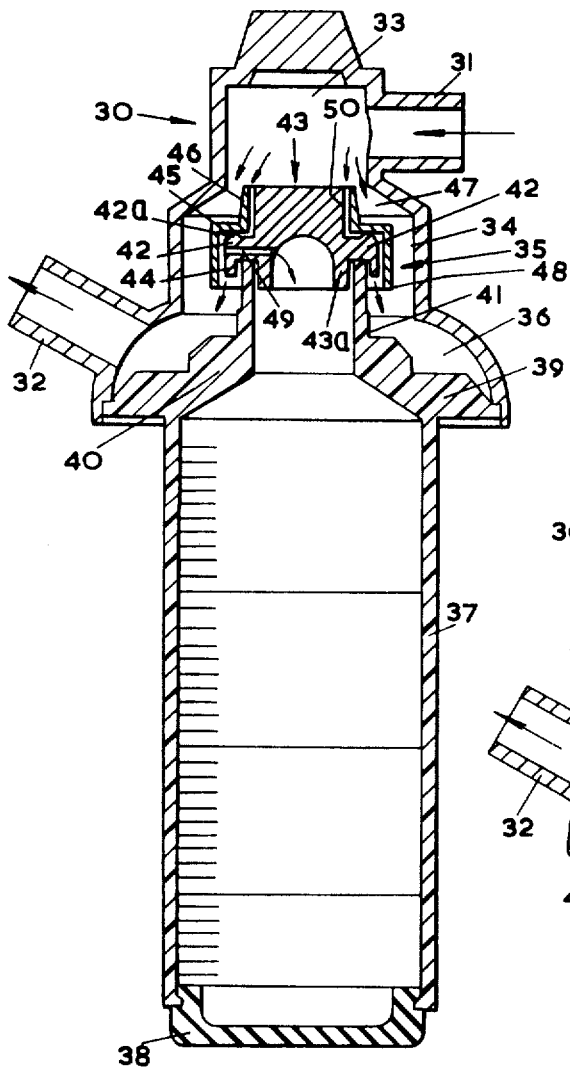
FIG. 1 is a sectional elevation of one embodiment of the invention.
Figure 2:
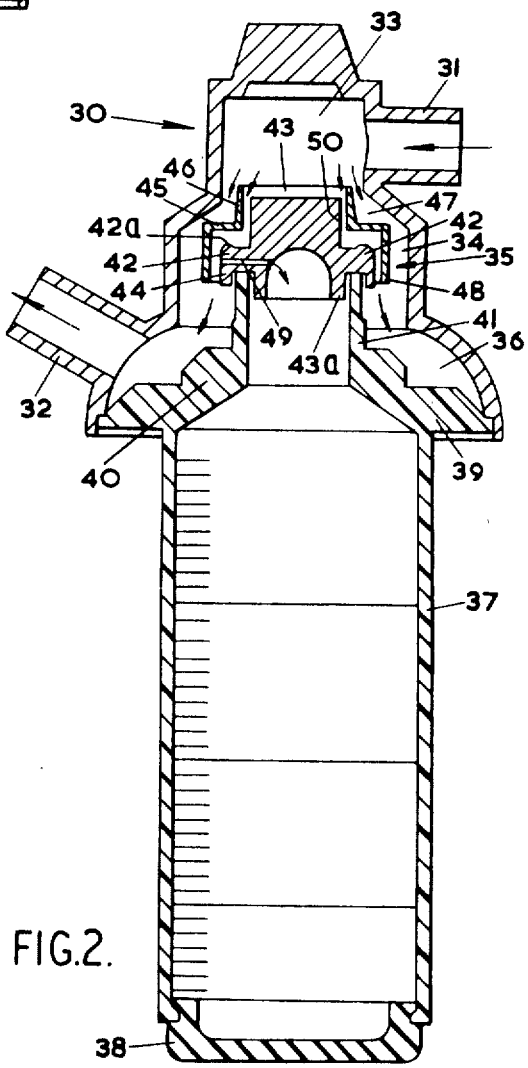
FIG. 2 is a view similar to FIG. 1 but showing the choke in a raised position.

In the embodiment of the invention shown in FIGS. 1 and 2 the improved meter is provided with an upper casing 30 having a milk inlet 31 and a milk outlet 32 both of which are for insertion in the milk line of a milking machine. The upper casing is further provided with an expansion chamber 33 at the top thereof, a chamber 34 of somewhat larger diameter and in which a choke 35 is located and a chamber 36 of still larger diameter, the outlet extending from this chamber.

The upper casing surmounts and is clipped or otherwise secured to a lower casing in the form of a cylindrical calibrated vessel 37 which at its lower end is closed by a rubber or like plug 38 and at its upper end has an external flange 39 and also an internal flange 40 which carries a central upwardly projecting neck 41 which extends into the aforesaid chamber 34.

Seated on the top of the neck is the flange 42 of a cylindrical closure member 43 having downwardly projecting annular skirts 43a and 44 which form therebetween an annular channel for the reception of the upper end of the neck.

Seated on a raised annular rib 42a of the flange 42 is the annular horizontal flanges 45 of the choke 35. Projecting upwardly from this flange is an annular wall 46 the outer face of which is upwardly and inwardly tapered. This wall forms with the casing a channel 47 leading to the chamber 34 and forms with the closure member an annular channel 50 substantially smaller in horizontal cross section than the channel 47. The choke is also provided with a downwardly extending annular wall 48 which encircles the flange 42 of the closure member and forms therewith an annular channel communicating with the chamber 34.

A radial duct 49 in the flange 42 of the closure member places the last-mentioned channel in communication with the neck.

The calibrated vessel 37 is of a translucent or transparent material, preferably a plastics material, and this preferably applies to the parts forming the upper part of the meter.

When the meter is in use the milk drawn from the cow enters through the inlet 31 into the expansion chamber 33 and the bulk of its flows downwardly through the channel 47 and then through the chamber 35 and into the chamber 36 from which it passes through the outlet to a milk receptacle. This flow of milk by acting on the flange 45 exerts a downward pressure on the choke. There is always a head of milk in the expansion chamber and therefore there is a second flow of milk through the channel 50 and the milk between the flange 45 of the choke and the flange 42 of the closure 43 exerts an upward pressure on the choke which latter is raised so that the fraction of the milk which enters the channel 50 will pass through this channel. It is necessary that the cross-sectional area between the rib 42a of the flange 42 and the inner wall of channel 50 should be greater than the cross-sectional area at the entry to channel 47, the pressure of the milk in this channel diminishing as its cross-sectional area increases. A fraction of this flow will pass through the duct 49 into the vessel 37 while the remainder thereof will pass into the chamber 36 to be discharged therefrom through the outlet 32. The arrows indicate the two flows of the milk.

The relative proportions of the flow of milk through the channels 47 and 50, assuming the choke is fixed, are not necessarily constant and proportional to the cross-sectional area of said channels. Thus the skin friction encountered by the milk in its passage through the channels can affect the relative proportions.

The milk may contain air, usually entrained air, and this may vary from time to time and further the solid matter contained in the milk likewise varies. All those factors vary and the result is that the upward force on the choke will also vary. When this upward force increases the choke will lift, compare its two positions shown in FIGS. 1 and 2, and when it decreases the choke will drop. When it rises the gap between the outer face of the tapered wall and the casing 30 will be reduced and the pressure of milk entering the channel 50 will be increased to increase the flow of the milk to the receptacle while at the same time reducing the flow through the channel 47.

Thus by suitable proportioning the channels, the gap at the entry to channel 47 and the taper of the outer face of the wall 46 it is possible to collect in the calibrated vessel a substantially definite proportion of the total milk yield of the cow irrespective of the density of the milk due to the presence of air and fats therein.

The calibrations are such that they will indicate the total volume of milk given by the cow. The separated-out fraction is not only representative of the total milk yield of the cow but is also representative of the quality of the said yield.

After a cow has been milked the meter can be turned upside down. The closure then drops clear of the neck and the contents of the vessel is then discharged through the neck into the chamber 36 and then through the outlet.

Figure 3:
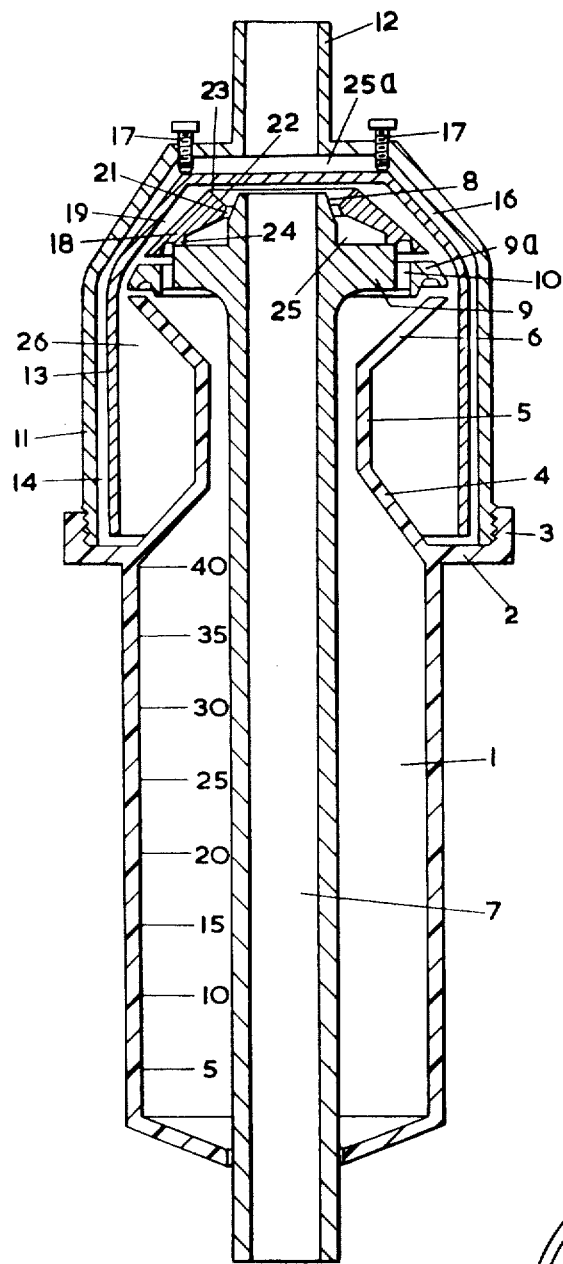
FIG. 3 is a sectional elevation of another embodiment of the invention.
Figure 4:
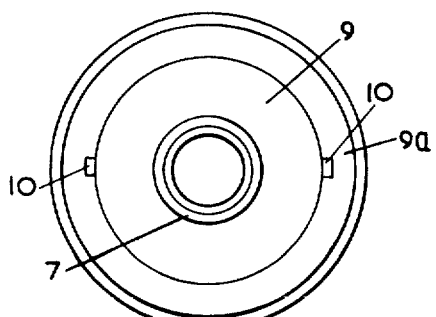
FIG. 4 is a plan view of the inlet pipe and the flange of this embodiment.

The meter shown in FIGS. 3 and 4 is provided with a cylindrical measuring vessel 1 which is transparent or translucent and which is suitably graduated to indicate the milk yield of a cow. Towards its upper end the vessel is provided with an external flange 2 with upwardly turned surrounding wall 3 which has a screw thread on its inner face. The vessel 1 above the flange is inwardly flared as at 4, then extends upwards to form a short cylinder 5 which terminates in a funnel 6. Extending upwardly through the foot of the cylinder 1 and projecting beyond the funnel is an inlet pipe 7 which at its upper end is bevelled as at 8 and somewhat below this bevelled end the pipe has formed integral therewith or has secured thereto an external flange 9 with annular projection 9a extending over the upper end of the funnel. This extension is provided with one or more openings 10 through which a small fraction of the milk yield can pass into the funnel and then into the cylindrical vessel 1.

Screwed into the screw-threaded wall is the lower open end of an inverted cup-like casing 11 which at its upper end has a short outlet pipe connection 12. Within said casing is an inner inverted cup-like vessel 13 which forms with the casing 11 an annular clearance 14 and also a space 25a. This space is located between the upper ends of casing and inverted cup and the outlet pipe 12 communicates with said space.

The casing 11 and vessel 13 taper upwardly and inwardly to form therebetween a passage 16 which is a continuation of the annular clearance 14.

This inner vessel 13 can move upwards to an extent limited by two setscrews 17 screwed into the top of the casing 11.

Between the flange 9 and the top of the inner vessel is an annular floating choke 18 of frustoconical section the outer wall thereof forming with the vessel 13 an annular passage 19 which is of tapered cross section and at its lower end terminates above the flange extension 9a. The upper end of the choke has an opening through which projects the bevelled end of the pipe 7, said opening forming with the end of the pipe a passage 21 the horizontal cross-sectional area of which will vary with the vertical position of the choke relative to the bevelled end of the pipe 7. Above said passage 21 the opening is flared outwards as at 22 to form with the outer face an annular rim 23. The choke is further provided with an annular downwardly projecting rib 24 which can seat on the flange 9. Further the choke forms with the flange 9 and the upper end of the pipe 7 an annular chamber 25 which is in communication with the channel 21.

The meter can be introduced into the milk line of a milking machine so that the milk enters the pipe 7 and is drawn through the outlet 12, a small fraction of the milk being separated out and passing into the measuring vessel 1.

In passing through the meter the milk will impinge on the inverted vessel 13 which is raised to an extent limited by the setscrews 17 and will be under pressure predetermined by the setting of the setscrews. The major portion of the milk will pass over the annular rim 23 and through passage 19 into the annular chamber 26. It then passes through passages 14 and 16 to the outlet 12.

A fraction of the milk also passes through passage 21 into the chamber 25 in which pressure builds up to raise the choke so that a predetermined fraction of the milk which enters the meter is thereby diverted. The ratio of the volume of milk which passes to the outlet and that so diverted, assuming the milk is at constant pressure, will depend on the gap between the rim of the choke and vessel 13 and the gap forming the passage 21 and this may be, for example, of the order of 6 to 1. Such separation of a fraction of the milk constitutes the first stage in isolating a fraction of the milk flow. The fraction of the milk which enters the chamber 25 spreads radially over the flange 9 and the greater part thereof flows over the flange extension 9a to fall into the chamber 26 where it joins the main milk flow. The remainder of the fraction which flows over the flange 24 drops through the opening or openings 10 into the funnel by which it is guided into the vessel 1. Thus the fraction separated out at the first stage is divided into a main flow and a separated-out fraction, the ratio of such being dependent on the size of the passage or passages 10. Such ratio may be, for example, of the order of 13 to 1. This constitutes the second stage.

Assuming that at the first stage one-seventh of the volume of milk entering the meter is separated out and from this fraction one-fourteenth is separated out the fraction of the total flow which passes to the vessel 1 is one ninety-eighth Thus with a very compact meter having only two moving parts it is possible to separate out a very small fraction which is collected in the measuring vessel and which will give a measurement of the milk yield of the cow being milked.

The division of the milk flow at the first stage varies in accordance with the pressure of the milk. Thus if there is an increase of pressure and no provision was made to compensate this the ratio of the main flow to the fraction separated therefrom is altered, this being due to the increased resistance to the flow encountered by the separated-out fraction. It will be seen that with increase in pressure of the milk discharged from the pipe 7 there is an increase in pressure of the milk in the chamber 25 and such increase lifts the choke.

By reason of the bevel 8 the gap between the bevel and the choke increases. In consequence the flow through the passage 21 is increased to maintain the aforesaid ratio constant. The reverse action occurs with a decrease in the pressure of the milk discharged from the pipe 24.

By means of the setscrews it is possible to adjust a flow through passages 22 and 19 so that for a given pressure the flows give a predetermined ratio.

After milking a cow its milk yield is indicated by the level of the milk in the vessel 1. Thereafter the milk in the vessel 1 can be emptied either by tilting the meter or by unscrewing the vessel from the casing.

The improved meter will operate as described with milk containing entrained air and therefore there is no necessity to remove such air from the milk.

I claim:

1. A milk meter comprising a casing having a milk inlet and milk outlet for connection in the milk line of a vacuum milking machine, a calibrated vessel positioned below and secured to said casing, a closure member at the upper end of said vessel, a floating choke encircling the closure member and forming with the casing and closure member respectively an outer and an inner annular channel, an annular chamber at the foot of the casing into which the aid channels discharge and from which extends the milk outlet, the floating choke controlling the size of the entrance to the outer channel and having a radial flange the upper face of which is subject to the pressure of milk in the outer channel and the under face of which is subject to the pressure of milk in the inner channel, and a passage in the closure member through which a portion of the milk in the inner channel is diverted into the calibrated vessel.

2. A milk meter as claimed in claim 1 wherein the upper end of the calibrated vessel has a neck on which seats a closure member provided with an external flange, a sleeve enclosing the closure member and which constitutes the choke, the sleeve having a flange to mate with the flange of the closure member and upwardly and downwardly projecting skirts extending respectively from the inner and outer peripheries of the flange and which form with the casing and the closure member of the two channels.

3. A milk meter as claimed in claim 2 wherein the closure member has one or more ducts by which the channel formed between said closure member and the choke is placed in communication with the interior of the calibrated vessel.

4. A milk meter as claimed in claim 1 wherein the upper end of the calibrated vessel has a neck on which seats a closure member provided with an external flange, a sleeve enclosing the closure member and which constitutes the choke, the sleeve having a flange to mate with the flange of the closure member and upwardly and downwardly projecting skirts which form with the housing and the closure member the two channels.

5. A milk meter comprising a pipe for connection to the milk line and having a bevelled outlet end, an external flange below the bevelled end, a truncated conical choke axially slidable on the pipe and normally resting on the flange, the choke and bevelled end of the pipe forming an annular channel communicating with a chamber formed between the underside of the choke and the flange, an inverted cup enclosing the upper end of the pipe and the choke and forming a chamber at the head of the pipe, said inverted cup constituting a baffle and forming with the choke an annular channel, both channels communicating with the chamber at the head of the pipe, an outer casing enclosing the inverted cup and having a milk outlet for connection to the milk line, the casing having adjustable stops to restrict the upward movement of the inverted cup, and a calibrated vessel positioned to receive the fraction of the milk discharged through the first-mentioned channel into the chamber between the choke and flange.

6. A milk meter as claimed in claim 5 wherein the flange has one or more passages through which the predetermined fraction of milk is diverted, the remainder of the milk which passes through the channel formed by the bevelled end of the inlet pipe and the choke being diverted to join the milk which has passed through the other channel.

7. A milk meter as claimed in claim 5 having a funnel at the upper end of the calibrated vessel to receive the diverted fraction and to form with the inverted cup a cavity which receives the remainder of the milk, said cavity communicating with an annular passage between the cup and casing which in turn is in communication with the milk outlet.